US009580160B2

(12) United States Patent
Hartig et al.

(10) Patent No.: US 9,580,160 B2
(45) Date of Patent: Feb. 28, 2017

(54) SHIP DRIVE SYSTEM HAVING A PLURALITY OF ELECTRIC DRIVE SHAFTS

(75) Inventors: Rainer Hartig, Buxtehude (DE); Kay Tigges, Harsefeld (DE); Michael Wycisk, Mönkeberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 89 days.

(21) Appl. No.: 13/575,481

(22) PCT Filed: Jan. 31, 2011

(86) PCT No.: PCT/EP2011/051323
§ 371 (c)(1),
(2), (4) Date: Jul. 26, 2012

(87) PCT Pub. No.: WO2011/092330
PCT Pub. Date: Aug. 4, 2011

(65) Prior Publication Data
US 2012/0302112 A1 Nov. 29, 2012

(30) Foreign Application Priority Data

Feb. 1, 2010 (DE) ........................ 10 2010 006 599

(51) Int. Cl.
*B63H 23/34* (2006.01)
*B63H 23/24* (2006.01)
(Continued)

(52) U.S. Cl.
CPC ............ *B63H 23/24* (2013.01); *B60L 3/0061* (2013.01); *B60L 11/08* (2013.01); *B63H 21/17* (2013.01);
(Continued)

(58) Field of Classification Search
CPC .. B63H 23/24; B63H 21/17; B63H 2021/205; B63H 21/20; B63H 5/08; B63H 2005/1258; B63H 2021/202
(Continued)

(56) References Cited

U.S. PATENT DOCUMENTS 6,597,082 B1 * 7/2003 Howard et al. ............ 310/254.1
7,353,764 B2 * 4/2008 Rzadki et al. .............. 114/65 R
(Continued)

FOREIGN PATENT DOCUMENTS

DE 3310506 A1 9/1984
DE 19522302 9/1996
(Continued)

OTHER PUBLICATIONS

Korean Office Action and English translation thereof dated Mar. 28, 2014.
(Continued)

*Primary Examiner* — Andrew Polay
(74) *Attorney, Agent, or Firm* — Harness, Dickey & Pierce, P.L.C.

(57) ABSTRACT

A ship drive system includes a first and one second drive shaft for driving a respective propulsion unit, wherein each of the electric drive shafts includes at least one speed-variable generator driven by an internal combustion engine for generating a motor voltage having a variable amplitude and variable frequency, and at least one speed-variable drive motor that is supplied with the voltage and coupled to the propulsion unit. The first and second drive shafts can be switched from a first operating state, in which they are electrically disconnected from each other, to a second operating state, in which they are electrically coupled to each other such energy can be transmitted from the at least one generator of the one drive shaft to the at least one drive (Continued)

motor of the other drive shaft. To this end, the at least one generator includes a superconductor winding.

20 Claims, 5 Drawing Sheets

(51) Int. Cl.
*B60L 11/08* (2006.01)
*B63H 21/17* (2006.01)
*B60L 3/00* (2006.01)
*B63H 21/20* (2006.01)
*B63H 11/04* (2006.01)
*B63H 11/00* (2006.01)
*B63J 3/02* (2006.01)

(52) U.S. Cl.
CPC ....... *B60L 2200/32* (2013.01); *B60L 2210/20* (2013.01); *B60L 2220/14* (2013.01); *B60L 2240/12* (2013.01); *B60L 2240/36* (2013.01); *B60L 2240/421* (2013.01); *B60L 2240/423* (2013.01); *B60L 2240/441* (2013.01); *B60L 2240/443* (2013.01); *B63H 11/04* (2013.01); *B63H 2011/008* (2013.01); *B63H 2021/173* (2013.01); *B63H 2021/202* (2013.01); *B63J 3/02* (2013.01); *Y02T 10/70* (2013.01); *Y02T 10/7077* (2013.01); *Y02T 70/5263* (2013.01); *Y02T 90/38* (2013.01)

(58) Field of Classification Search
USPC .......................................... 440/3, 4, 6, 79, 80
See application file for complete search history.

(56) References Cited

U.S. PATENT DOCUMENTS

| 8,204,977 B1 * | 6/2012 | Brodersen et al. ........... 709/223 |
| 8,216,008 B2 | 7/2012 | Daffey |
| 8,299,638 B2 * | 10/2012 | Sandoy et al. .................... 290/9 |
| 2009/0156068 A1 * | 6/2009 | Barrett et al. .................... 440/3 |
| 2009/0215328 A1 | 8/2009 | Daffey |

FOREIGN PATENT DOCUMENTS

| FR | 2533192 | 3/1984 |
| GB | 190925734 A | 10/1910 |
| KR | 20090061649 A | 6/2009 |
| WO | WO 2005/025981 | 3/2005 |
| WO | WO 2008020264 A1 * | 2/2008 |
| WO | WO 2008/081189 | 7/2008 |
| WO | WO 2009/112876 | 9/2009 |

OTHER PUBLICATIONS

Chinese Office Action and English translation thereof dated Jun. 30, 2014.
International priority document application No. PCT/EP2011/051323 filed Jan. 31, 2011.
German priority document application No. DE 10 2010 006 599.4 filed Feb. 1, 2010.
Search Report and Written Opinion for corresponding Singapore patent application No. 201205654-5 dated May 23, 2013 (in English).
Australian Office Action mailed Apr. 4, 2013.

* cited by examiner

SHIP DRIVE SYSTEM HAVING A PLURALITY OF ELECTRIC DRIVE SHAFTS

PRIORITY STATEMENT

This application is the national phase under 35 U.S.C. §371 of PCT International Application No. PCT/EP2011/051323 which has an International filing date of Jan. 31, 2011, which designated the United States of America, and which claims priority to German patent application number DE 10 2010 006 599.4 filed Feb. 1, 2010, the entire contents of each of which are hereby incorporated herein by reference.

FIELD

At least one embodiment of the invention generally relates to a ship drive system having a plurality of electric drive shafts, as well as to an advantageous application of such a ship drive system.

BACKGROUND

Electric drive systems on ships (e.g. on all-electric ships) typically comprise one or more electric drive motors, each of which is provided for driving one propulsion unit (e.g. a propeller), which are fed in each case by way of a converter from an electrical power network of the ship (often also referred to as a "propulsion network"). The electrical power network is in turn fed by one or more diesel generators. In this case the electrical power network has a voltage of predetermined fixed amplitude and frequency, e.g. a medium voltage having a rated voltage of 6.6 kV at a rated frequency of 60 Hz. A transformer may also be connected into the circuit between the converter and the electrical power network. The converters convert the (where necessary downtransformed) supply voltage into a voltage required for operation of the drive motors and having a different amplitude and frequency from the supply voltage.

Low-voltage power-consuming loads on board a ship (e.g. navigation and control equipment, public address system, lighting) are supplied by means of a separate electrical onboard power network that typically has a rated voltage of 400 V at a rated frequency of 50 Hz or 440V at 60 Hz. The electrical onboard power network can be fed with electrical energy by dedicated electrical onboard power network generators independently of the propulsion network. Alternatively the electrical onboard power network can be supplied from the propulsion network by way of an electrical onboard power network converter and where necessary a transformer. The electrical onboard power network converter, in combination with the transformer where necessary, converts the voltage of the propulsion network into a voltage having the amplitude and frequency of the electrical onboard power network.

A great advantage of this solution is that backlash effects on the propulsion network due to sudden load shocks (e.g. when a propeller lifts out of the water and is reimmersed in heavy seas) can be avoided by way of the converter if the latter is dimensioned with a commensurately large capacity. Apart from many other advantages, however, these drive concepts have the disadvantage that they require a comparatively large number of converters for converting the voltage in the propulsion network, with corresponding space requirements and costs.

A further known electric drive solution which manages without converters of such a type resides in coupling the generators and the drive motors to each other without intermediately connected converters. In a drive solution of such a type, one or more speed-variable drive motors without intermediately connected converters are operated directly with the voltage of variable amplitude and variable frequency that is generated by one or more speed-variable generators.

The open- and/or closed-loop control of the motors and consequently of the propulsion units is therefore accomplished indirectly by way of open- and/or closed-loop control of the internal combustion engines for driving the generators. In this case the drive motors are permanently electrically coupled to the generators, i.e. a rotational movement of the generators effects a correspondingly proportional rotational movement of the electric drive motors. The function of a mechanical shaft is therefore replicated with the aid of electric machines. A drive solution of this type is frequently referred to as an "electric shaft".

It is also known here to couple out electrical energy from the electric shaft by way of an electrical onboard power network converter and where necessary a transformer, i.e. an electrical onboard power network converter, in combination with a transformer where necessary, converts the voltage of variable amplitude and variable frequency generated by the generator(s) into a voltage having constant amplitude and constant frequency for an electrical onboard power network.

Multihulled vessels such as e.g. catamarans or trimarans capable of speeds in excess of 40 knots are particularly suitable for express ferries and navy applications in which high speeds are important. They enjoy increasing popularity for that reason. For propulsion purposes these vessels have waterjets, for example, which are mechanically coupled directly to diesel engines or gas turbines and are driven by the latter. The mechanical direct drive does however lead to vessel design constraints which prevent the vessel being designed in an optimal manner (in respect, inter alia, of hydrodynamic and functionality aspects).

SUMMARY

At least one embodiment of the present invention discloses a ship drive system—suitable in particular for high-speed multihulled vessels—which is characterized by high levels of fault tolerance and energy efficiency and allows an optimal vessel design.

A ship drive system according to at least one embodiment of the invention comprises at least a first and a second electric drive shaft, each of which is provided for driving a propulsion unit, in particular a waterjet, wherein each of the electric drive shafts comprises at least one speed-variable generator driven by an internal combustion engine for generating a motor voltage having variable amplitude and variable frequency, and at least one speed-variable drive motor supplied with the motor voltage and coupled to a propulsion unit. In this arrangement the first and the second drive shaft can be switched from a first operating state in which they are electrically decoupled from each other, to a second operating state in which they are electrically coupled to each other in such a way that a transfer of energy can take place from the at least one generator of one drive shaft to the at least one drive motor of the other drive shaft.

BRIEF DESCRIPTION OF THE DRAWINGS

The invention and further advantageous embodiments of the invention in accordance with features of the dependent claims are explained in more detail below with reference to example embodiments illustrated in the figures, in which:

DETAILED DESCRIPTION OF THE EXAMPLE EMBODIMENTS

Figure 1:
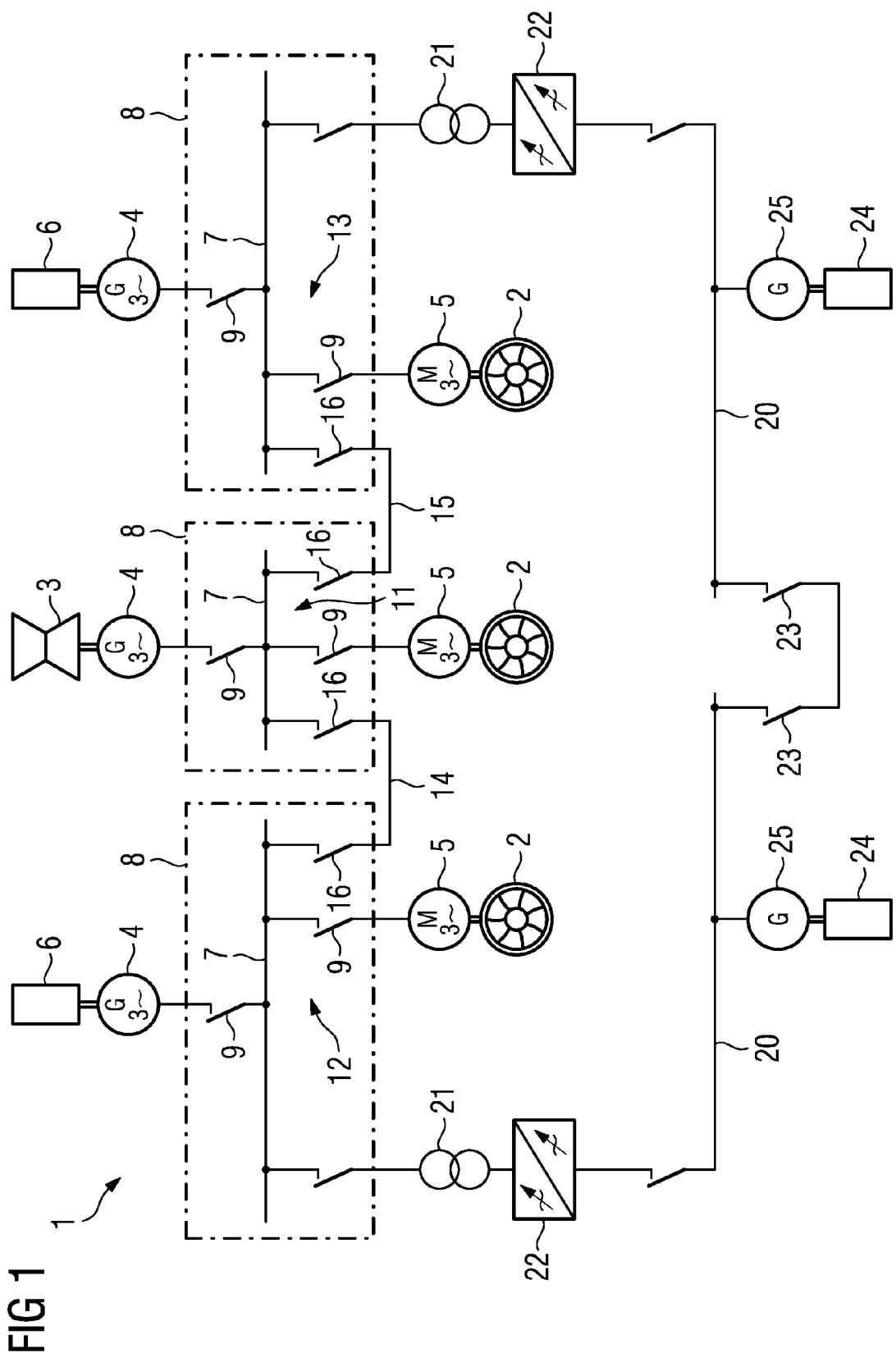
FIG. 1 shows a first example embodiment of a ship drive system according to the invention.

A ship drive system according to at least one embodiment of the invention comprises at least a first and a second electric drive shaft, each of which is provided for driving a propulsion unit, in particular a waterjet, wherein each of the electric drive shafts comprises at least one speed-variable generator driven by an internal combustion engine for generating a motor voltage having variable amplitude and variable frequency, and at least one speed-variable drive motor supplied with the motor voltage and coupled to a propulsion unit. In this arrangement the first and the second drive shaft can be switched from a first operating state in which they are electrically decoupled from each other, to a second operating state in which they are electrically coupled to each other in such a way that a transfer of energy can take place from the at least one generator of one drive shaft to the at least one drive motor of the other drive shaft.

Compared to mechanical direct drives, the use of electric drive shafts results in much greater creative freedom in terms of vessel design, since the internal combustion engines can be arranged, not in proximity to the propulsion units, but separated therefrom at another location in the vessel. Advantages are also gained in comparison with converter-fed diesel-electric drives, since the omission of the converters results in space and weight savings, which is important in particular in high-speed multihulled vessels such as e.g. catamarans and trimarans. The possibility of transferring electrical energy from one drive shaft to the other in the second operating state means that in the event of an energy generation failure in one of the drive shafts the energy can be supplied by the at least one generator of the other drive shaft. This enables a high level of fault resilience of the vessel to be achieved, which is important in particular for navy vessels. Furthermore, the overall energy consumption of the ship drive system can be optimized, since in the low speed range, for example, in which the internal combustion engines operate at relatively poor efficiency, the energy generation of one drive shaft is intentionally switched off and the electrical energy required for operation of its drive motors is generated and transferred by one or more generators of the other drive shaft.

According to a particularly advantageous embodiment of the invention, the ship drive system additionally comprises a third electric drive shaft for driving a further propulsion unit, in particular a waterjet, wherein the third drive shaft comprises at least one speed-variable generator driven by an internal combustion engine for generating a motor voltage having variable amplitude and variable frequency, and at least one speed-variable drive motor supplied with the motor voltage and coupled to the further propulsion unit, and wherein the first and the third drive shaft can be switched from a first operating state in which they are electrically decoupled from each other, to a second operating state in which they are electrically coupled to each other in such a way that a transfer of energy can take place from the at least one generator of one drive shaft to the at least one drive motor of the other drive shaft. This enables the propulsion force (and hence the maximum speed of the vessel, for example), fault tolerance and energy efficiency to be increased even further.

The at least one generator preferably has a superconductor winding, in particular a high-temperature superconductor (HTS) winding. The superconductor winding can be a stator winding or a rotating rotor winding of the generator. Compared to conventional machines, generators implemented on the basis of superconductor technology have a greater power density (i.e. power in relation to the installation volume). Even more far-reaching optimizations in vessel design are possible as a result. Given the same drive input power, the maximum speed and/or loading capacity of the vessel can be increased thanks to the comparatively lower weight. Moreover, a generator having a superconductor winding typically has a much greater magnetic air gap between rotor and stator compared to a conventional generator without superconductor winding. This is principally because the superconductor is cooled by way of a vacuum cryostat or a similar cooling device whose wall structure runs in the air gap.

The effect of the relatively large magnetic air gap is that the generator has a much lower synchronous reactance than a conventional generator. Consequently an HTS generator has a considerably stiffer current vs. voltage characteristic curve for the same electrical power compared to a conventional generator. As a result there is no dip in the voltage generated by the generator in the event of abrupt changes in load or sudden load shocks. Voltage and frequency fluctuations in the electric shaft can be reduced thereby. Accordingly, no complex and expensive closed-loop control means is required for the electric shaft in order to stabilize the voltage of the drive shaft and the speed of the drive motors or of the propulsion unit.

If the at least one drive motor also has a superconductor winding, in particular a high-temperature superconductor (HTS) winding, it can be embodied as an extremely high-powered and high-torque motor with a small design footprint, which is important in particular for high-speed vessels such as e.g. catamarans and trimarans.

The superconductor winding is preferably a rotating rotor winding, since in the latter case the surface requiring to be cooled can be kept smaller than in the case of a superconductor stator winding.

The coupling of the drive shafts can be accomplished in a particularly low-loss manner by means of an electric line connection which preferably includes a superconductor, in particular a high-temperature superconductor (HTS).

According to a particularly advantageous embodiment, the second and the third drive shaft serve as the main drive for a lower speed range of the vessel (e.g. from zero to 30 knots) and the first drive shaft on its own or in combination with the second and the third drive shaft serves as the main drive for a higher speed range up to the maximum speed of the vessel (e.g. up to 45 knots).

In this case the internal combustion engine of the first drive shaft is advantageously embodied as a gas turbine and the internal combustion engines of the second and the third drive shaft are advantageously embodied as diesel engines.

The ship drive system preferably comprises an electrical onboard power network converter which is supplied with the motor voltage having variable amplitude and variable frequency of one of the drive shafts and which converts the motor voltage into a voltage having constant amplitude and constant frequency for an electrical onboard power network. Particular advantages are produced here if the at least one generator of the drive shaft has a superconductor winding and consequently the drive shaft is characterized by a particular stiffness. On account of the avoidance of voltage and frequency fluctuations on the electric shaft owing to the stiffness of the characteristic curve of the generator or generators it is then also possible to avoid impermissible fluctuations in the voltage generated by the electrical onboard power network converters and consequently safety shutdowns of the electrical onboard power network converter or an overdimensioning of the electrical onboard power network converter.

In order to achieve a further increase in fault tolerance the ship drive system can also comprise a first electrical onboard power network converter which is supplied with the motor voltage having variable amplitude and variable frequency of the second drive shaft and which converts the voltage into a voltage having constant amplitude and constant frequency for a first electrical onboard power subnetwork, and a second electrical onboard power network converter which is supplied with the motor voltage having variable amplitude and variable frequency of the third drive shaft and which converts the voltage into a voltage having constant amplitude and constant frequency for a second electrical onboard power subnetwork.

In this case the level of fault tolerance can be raised even further in that the two electrical onboard power subnetworks can be coupled to each other.

According to a further advantageous embodiment the ship drive system comprises at least one additional electrical onboard power network generator for supplying the electrical onboard power network or an electrical onboard power subnetwork with a voltage having constant amplitude and constant frequency. This enables the voltage supply of the electrical onboard power network to be ensured even when the electric drive shaft is switched off (e.g. in port) or when all of the generator power of the drive shaft is required for driving purposes.

If the at least one generator of the drive shaft can optionally be driven either at a fixed or at a variable frequency by the internal combustion engine driving it, further potential uses are opened up for these components. For example, the at least one generator can be used for supplying power to other vessels in port.

According to a particularly advantageous embodiment the drive shaft can be switched from an operating state in which the at least one generator of the drive shaft is electrically coupled to the at least one drive motor of the drive shaft without an electrical onboard power network converter being interposed therebetween and generates a voltage of variable amplitude and frequency, to an operating state in which the at least one generator of the drive shaft is electrically coupled to the at least one drive motor of the drive shaft by way of an electrical onboard power network converter, the electrical onboard power network converter generating a voltage of variable amplitude and frequency.

It is then possible to switch from the first operating state that is present in a normal mode of operation for small speed requirements placed on the internal combustion engine for driving the generator, in particular for speed requirements that lie below a minimum speed requirement of the internal combustion engine, to the second operating state in which the electrical onboard power network converter is connected to the electric drive shaft, i.e. is inserted into the electrical connection between the at least one generator and the at least one drive motor of the drive shaft. By way of the electrical onboard power network converter and where necessary one or more transformers the drive motor can then be fed with a voltage which has a lower frequency than the voltage generated by the generator. The drive motor can then drive the propulsion unit at a relatively high torque even at low speeds. This means that no variable-pitch propeller is necessary for low speeds, but instead a fixed-pitch propeller can be used.

Alternatively and/or in addition, the drive shaft can be switchable from an operating state in which the at least one generator of the drive shaft is electrically coupled to the at least one drive motor of the drive shaft without the electrical onboard power network converter being interposed therebetween and generates a voltage of variable amplitude and frequency, to an operating state in which the electrical onboard power network or electrical onboard power subnetwork is electrically coupled to the at least one drive motor of the drive shaft by way of the electrical onboard power network converter, the electrical onboard power network converter generating a voltage of variable amplitude and frequency. As a result the drive motor can likewise drive the propulsion unit with a relatively high torque at low speeds. In the event of a failure of the generators of the electric shaft the drive motor can furthermore be supplied from the electrical onboard power network.

By virtue of the aforementioned advantages the invention is suitable in particular for use in a multihulled vessel, in particular in a catamaran or a trimaran.

A ship drive system 1 according to an embodiment of the invention as shown in FIG. 1 comprises three electric drive shafts 11, 12, 13, each of which is provided for driving a propulsion unit in the form of a waterjet (waterjet drive) 2.

The first drive shaft 11 comprises a speed-variable generator 4 driven by a gas turbine 3 for generating a motor voltage of variable amplitude and variable frequency, and a speed-variable drive motor 5 supplied with the motor voltage and coupled to a waterjet 2.

The second and the third drive shaft 12, 13 each comprise a speed-variable generator 4 driven by a diesel engine 6 for generating a motor voltage having variable amplitude and variable frequency, and a speed-variable drive motor 5 supplied with the motor voltage and coupled to a waterjet 2.

In the case of the drive shafts 11, 12, 13, a generator 4 and a drive motor 5 are in each case electrically connected to one another by way of a busbar 7. The connection of the generators 4 and the drive motors 5 to the busbar 7 is effected here by way of a switch 9 in each case. The busbar 7 and the switches 9 are part of a switchgear 8. The busbar 7 of the first drive shaft 11 can in this case be connected by way of a line connection 14 to the busbar 7 of the second drive shaft 12 and by way of a line connection 15 to the busbar 7 of the third drive shaft 13. The line connections 14, 15 are connected to the busbar 7 here by way of a switch 16 in each case.

The first drive shaft 11 can optionally be coupled to the second and/or the third drive shaft 12, 13 by way of the line connections 14, 15 and the switches 16.

A mechanical transmission can also be connected in addition between a generator 4 and the gas turbine 3 or diesel engine 6 driving it, as well as between the waterjet 2 and the drive motor 5 driving it. Furthermore, the drive shafts 11, 12, 13 can also comprise a plurality of generators and/or drive motors instead of just a single generator 4 and drive motor 5 in each case.

The voltage of variable amplitude and variable frequency generated by the generators 4 of the electric drive shafts 12, 13 is additionally used by way of a transformer 21 in each case to operate an electrical onboard power network converter 22 which converts the variable voltage into a voltage having constant amplitude and constant frequency for an electrical onboard power subnetwork 20 in each case. Low-voltage power-consuming loads of the vessel (e.g. navigation and control equipment, public address system, lighting; not shown in further detail) are supplied from the electrical onboard power subnetwork 20. The electrical onboard power subnetwork 20 typically has a rated voltage of 400V at a rated frequency of 50 Hz or 440V at 60 Hz. The two electrical onboard power subnetworks 20 can be coupled to each other by way of switches 23, with the result that it is possible to supply both electrical onboard power subnetworks 20 even in the event of failure or shutdown of one of the two drive shafts 12, 13.

An additional port generator 25 driven by an internal combustion engine 24 in each case is used, preferably by way of a downstream-connected converter (not shown in further detail), to supply an electrical onboard power subnetwork 20 in each case or the electrical onboard power subnetworks 20 coupled to one another with a voltage having constant amplitude and constant frequency when electric shafts 12, 13 are switched off, for example when the vessel is in port and no driving power is required or when all of the output capacity of the generators 4 is required for the driving function. In addition and/or alternatively, the electrical onboard power subnetworks 20 can also be fed by means of a battery or by means of fuel cells instead of by the port generator 25.

In the normal mode of operation the ship drive system 1 is in a first operating state in which the switches 9 are closed and the switches 16 are open.

The drive motors 5 are operated by way of the voltage having variable amplitude and variable frequency generated by the respective generator 4, without an intermediately connected converter. The open- and/or closed-loop control of the rotational speed of the drive motors 5, and hence of the waterjets 2, is therefore accomplished indirectly by means of the open- and/or closed-loop control of the gas turbine 3 or of the diesel engines 6 for driving the generators 4. A rotational movement of the gas turbine 3 or of the diesel engines 6, and consequently of the generators 4, accordingly effects a correspondingly proportional rotational movement of the motors 5. The function of a mechanical shaft is therefore replicated with the aid of electric machines.

The second and the third drive shaft 12, 13 serve in this case as the main drive for a lower speed range of the vessel (e.g. up to 30 knots) and the first drive shaft 11 on its own or in combination with the second and the third drive shaft serves as the main drive for a higher speed range up to the maximum speed of the vessel (e.g. 45 knots). The output capacity of the diesel engines ranges for example from 1 MW to 20 MW, in particular is equal to 10 MW, and that of the gas turbine ranges from 5 MW to 30 MW, in particular is equal to 20 MW.

Figure 2:
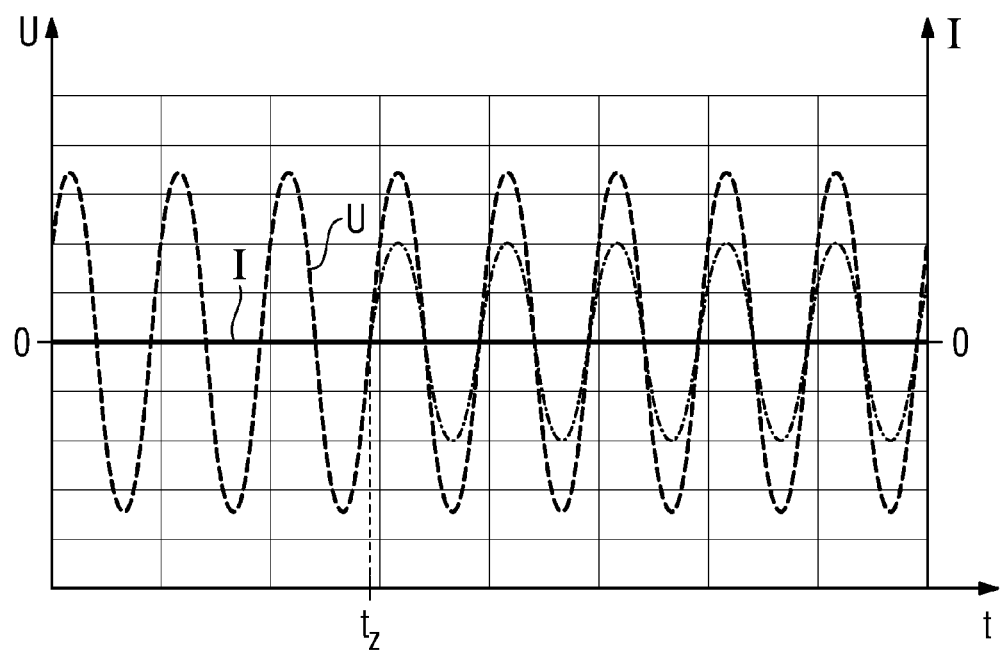
FIG. 2 shows a current vs. voltage characteristic curve of an HTS generator upon application of a load.

The generators 4 are embodied here as synchronous machines having a rotating HTS field winding (i.e. an HTS winding in the rotor). Machines of such type have a low synchronous reactance and therefore great stiffness in their current vs. voltage characteristic curve. By way of example, FIG. 2 shows in this regard the characteristic curve of a synchronous generator having a rotating HTS field winding and an output capacity of 400 kW for the case of the application of a full load from zero to 380 kW. A machine of such a type has for example a synchronous longitudinal reactance $xd=0.15$. As can be seen from the shape of the current curve I and the voltage curve U, no dips in the voltage U occur when the load is connected into the circuit at time tz. This demonstrates the extremely stable operating response of such a machine even under extreme fluctuations in load.

As a result there are no noticeable backlash effects on the input voltage of the electrical onboard power network converters 22 in the event of abrupt load shocks on the part of the waterjets (as may be caused e.g. in heavy seas). The electrical onboard power network converters 22 can therefore be equipped with much lower dynamic reserves than when conventional synchronous machines without HTS winding are used as generators in the drive shafts 11, 12, 13. Furthermore, a complex and expensive closed-loop control system for stabilizing the speed (or voltage and frequency) of the respective drive motor 5 or waterjet 3 can be dispensed with in the drive shafts 11, 12, 13.

It is advantageous if the drive motors 5 are also embodied as high-powered and high-torque synchronous machines having a rotating HTS field winding (i.e. an HTS winding in the rotor).

For special operating situations it is possible, by closing the switches 16, to switch the first drive shaft 11 and the second drive shaft 12 as well as the first drive shaft 11 and the third drive shaft 13 from a first operating state in which they are electrically decoupled from each other, to a second operating state in which they are electrically coupled to each other in such a way that a transfer of energy can take place from the generator 4 of one drive shaft to the drive motor 5 of the other drive shaft. It is furthermore possible also to transfer energy between the second and the third drive shaft 12, 13 by way of the busbar 7 of the first drive shaft 11.

By this, it is possible on the one hand to supply energy to a drive shaft even in the event of a failure of its energy generators (i.e. gas turbine 3 or diesel engine 6), thereby enabling a significant increase in the level of fault resilience, in particular for navy vessels. On the other hand the energy can be generated according to requirements using precisely as many energy generators as necessary to ensure these will operate at a good level of efficiency in an operating point.

Synchronizing the amplitude, frequency and phase of the voltage generated by the generators 4 also enables a drive motor 5 to be fed simultaneously by generators 4 of different drive shafts.

The stiffness of the current vs. voltage characteristic curves of the drive shafts 11, 12, 13 means that a complex and expensive closed-loop control system for stabilizing the speeds (or voltage and frequency) of the drive motors 5 or waterjets 3 and the output voltage of the electrical onboard power network converters 22 can also be dispensed with in the second operating state of the ship drive system.

The ship drive system 1 preferably finds application in a trimaran. In this case the drive shafts 11, 12, 13 are located with the waterjets 3 in the middle hull of the trimaran. Obviously a vessel can also have more than three such waterjets 3 with a corresponding number of electric drive shafts.

Figure 3:
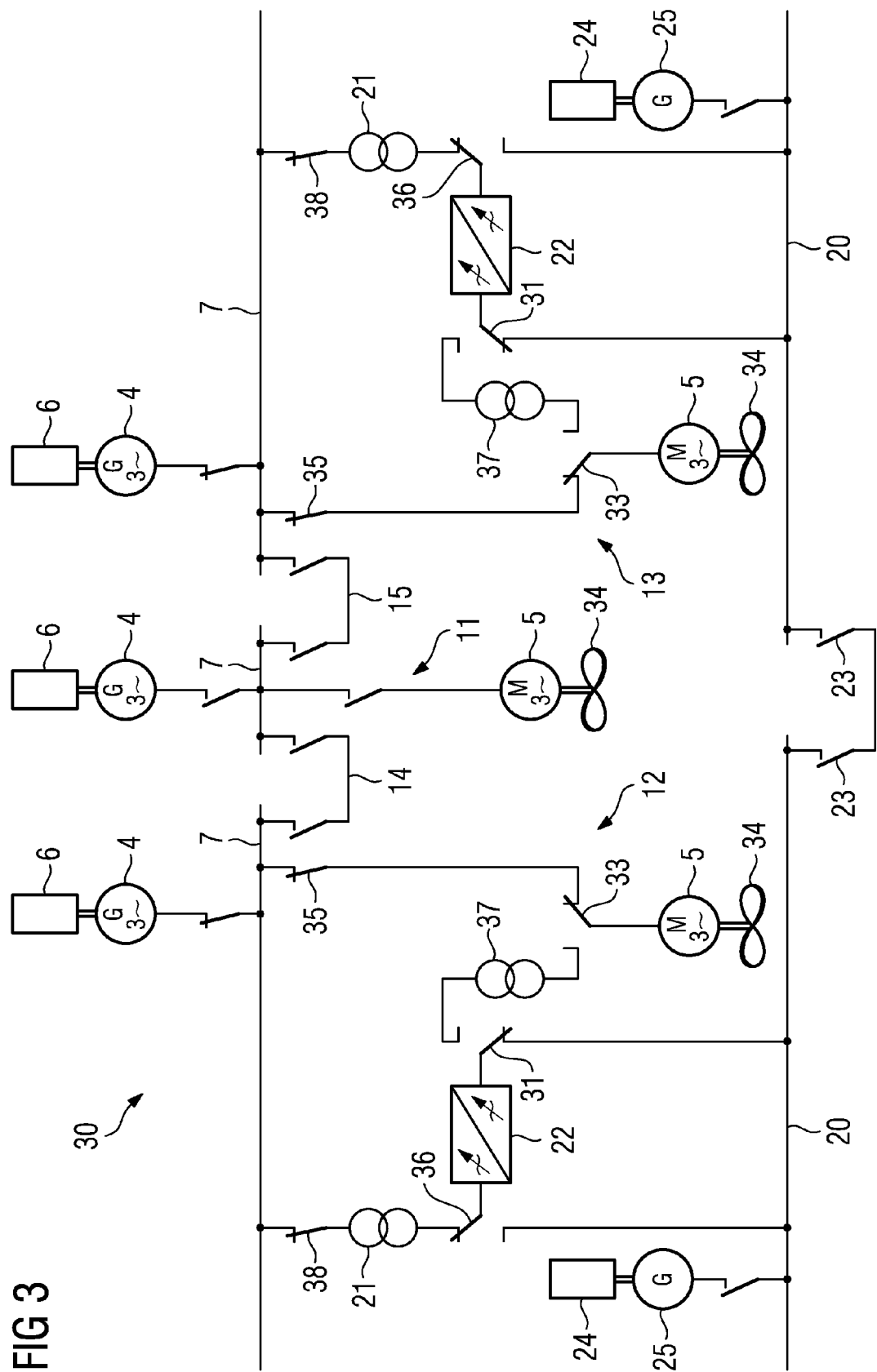
FIG. 3 shows a second example embodiment of a ship drive system according to the invention in a first operating state.

A ship drive system 30 shown in FIG. 3 differs from the ship drive system 1 shown in FIG. 1 on the one hand in that it has propellers 34 instead of waterjets as propulsion units and in that the first electric drive shaft 11 has a diesel engine 6 instead of a gas turbine for driving the generator 4. The propellers 34 must be able to be operated at relatively low speeds and relative low capacity. In that respect the diesel engines 6 have a relatively poor level of efficiency. The propulsion network with the busbars 7 is for example a medium-voltage propulsion network having a voltage of 6.6 kV/60 Hz and the electrical onboard power network 20 has a voltage of 660V/60 Hz.

Figure 4:
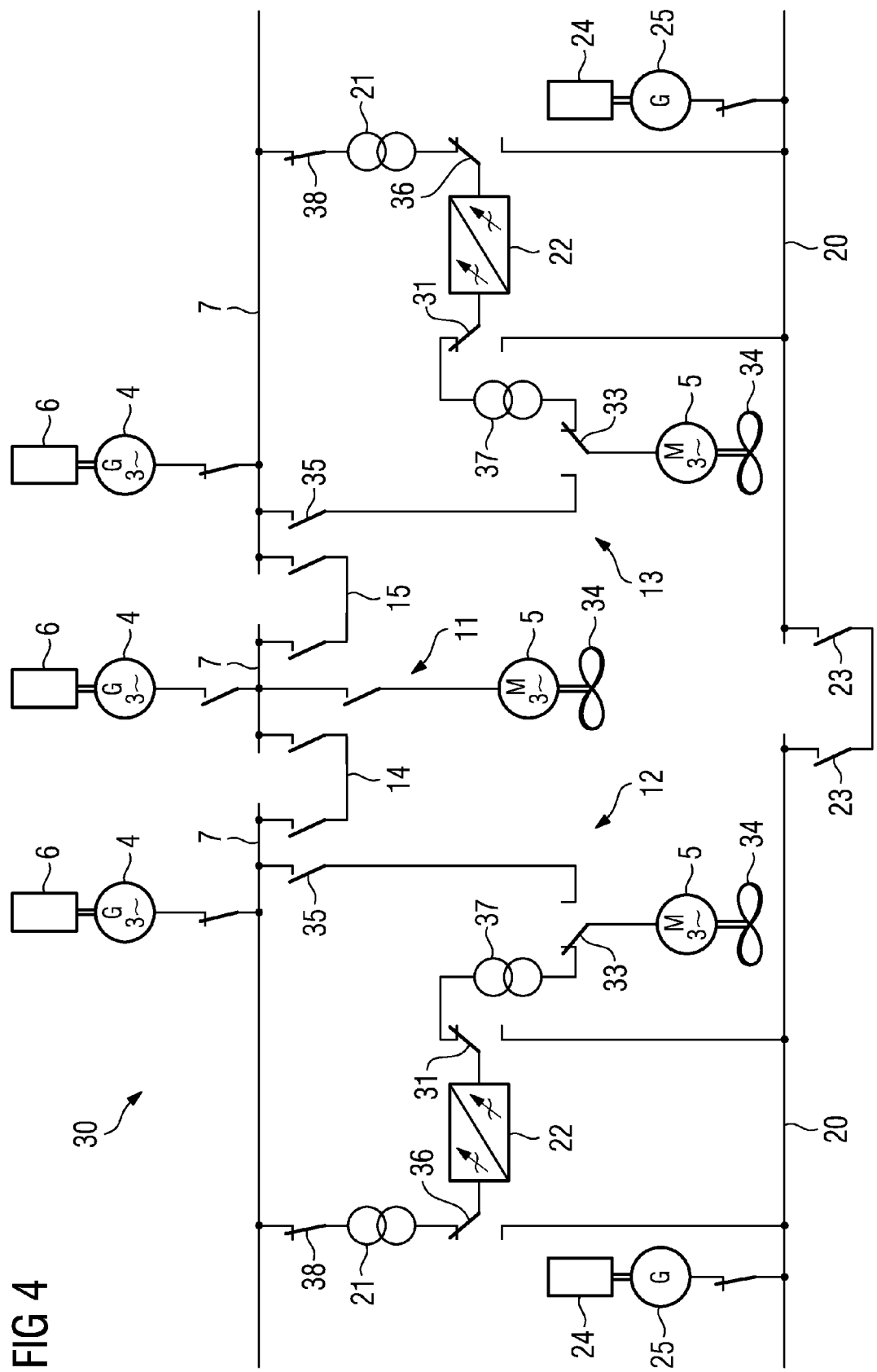
FIG. 4 shows the example embodiment from FIG. 3 in a first special operating state.

The ship drive system 30 differs from the ship drive system 1 shown in FIG. 1 on the other hand in that the second and the third drive shaft 12, 13 can be switched from a normal operating state, as shown in FIG. 3, in which the drive shafts 12, 13 are each electrically coupled to a respective electrical onboard power subnetwork 20 by way of a respective transformer 21 and an electrical onboard power network converter 22 and in which the generator 4 of the drive shaft 12, 13 is electrically coupled to the drive motor 5 of the respective drive shaft 12, 13, without the electrical onboard power network converter 22 being interposed therebetween, to a first special operating state, as shown in FIG. 4, in which the generator 4 of the drive shaft 12, 13 is electrically coupled to the drive motor 5 of the respective drive shaft 12, 13 by way of the transformer 21, the electrical onboard power network converter 22 and a transformer 37.

In the normal operating state the generators 4 are then driven as described hereintofore by the diesel engines 6 in such a way that they generate a motor voltage having variable amplitude and variable frequency. On the one hand the respective drive motor 5 is supplied with the variable voltage. On the other hand the variable voltage is then converted by way of the respective transformer 21 and the electrical onboard power network converter 22 into the voltage of constant amplitude and frequency of the electrical onboard power subnetwork 20.

When the diesel engines 6 are subject to speed requirements below their minimum speed requirement, the ship drive system 30 can be switched over from the normal operating state to the first special operating state. The generators 4 are then driven by the diesel engines 6 at their minimum speed such that they generate a motor voltage having constant amplitude and frequency. The voltage is converted by way of the respectively connected transformer 21, electrical onboard power network converter 22 and transformer 37 into a voltage of variable amplitude and frequency for supplying the respective drive motor 5, the frequency of the converted voltage being less than the frequency of the voltage generated by the generator 4.

Toward that end the electrical onboard power network converter 22 can be connected on the output side either to the electrical onboard power subnetwork 20 by way of a switch 31 or to the drive motor 5 by way of the transformer 37 and a switch 33. The drive motor 5 is connectable in turn by way of the switch 33 either to the output of the electrical onboard power network converter 22 (by way of the transformer 37 and the switch 31) or to the busbar 7 of the respective drive shaft 12, 13 (by way of a switch 35). On the input side the electrical onboard power network converter 22 can be connected to the busbar 7 of the respective drive shaft 12, 13 by way of a switch 36, the transformer 21 and a switch 38.

In the first special operating state shown in FIG. 2, the electrical onboard power subnetworks 20 can be supplied with current either by the respective port generator 25 or by way of an additional electrical onboard power network converter (not shown in further detail) which can be connected to the busbar 7 for example by way of the transformer 21 and the switch 38.

Alternatively, provided the transformer 21 is dimensioned for an adequate capacity, an electrical onboard power subnetwork 20 can also be connectable directly to the busbar 7 by way of the transformer 21 and the switch 38 and consequently can be supplied with current directly from the busbar 7 without an electrical onboard power network converter being interposed therebetween. In this case a parallel mode of operation is then also possible with the electrical onboard power network converter 22, by way of which the drive motor 5 is supplied with current.

Figure 5:
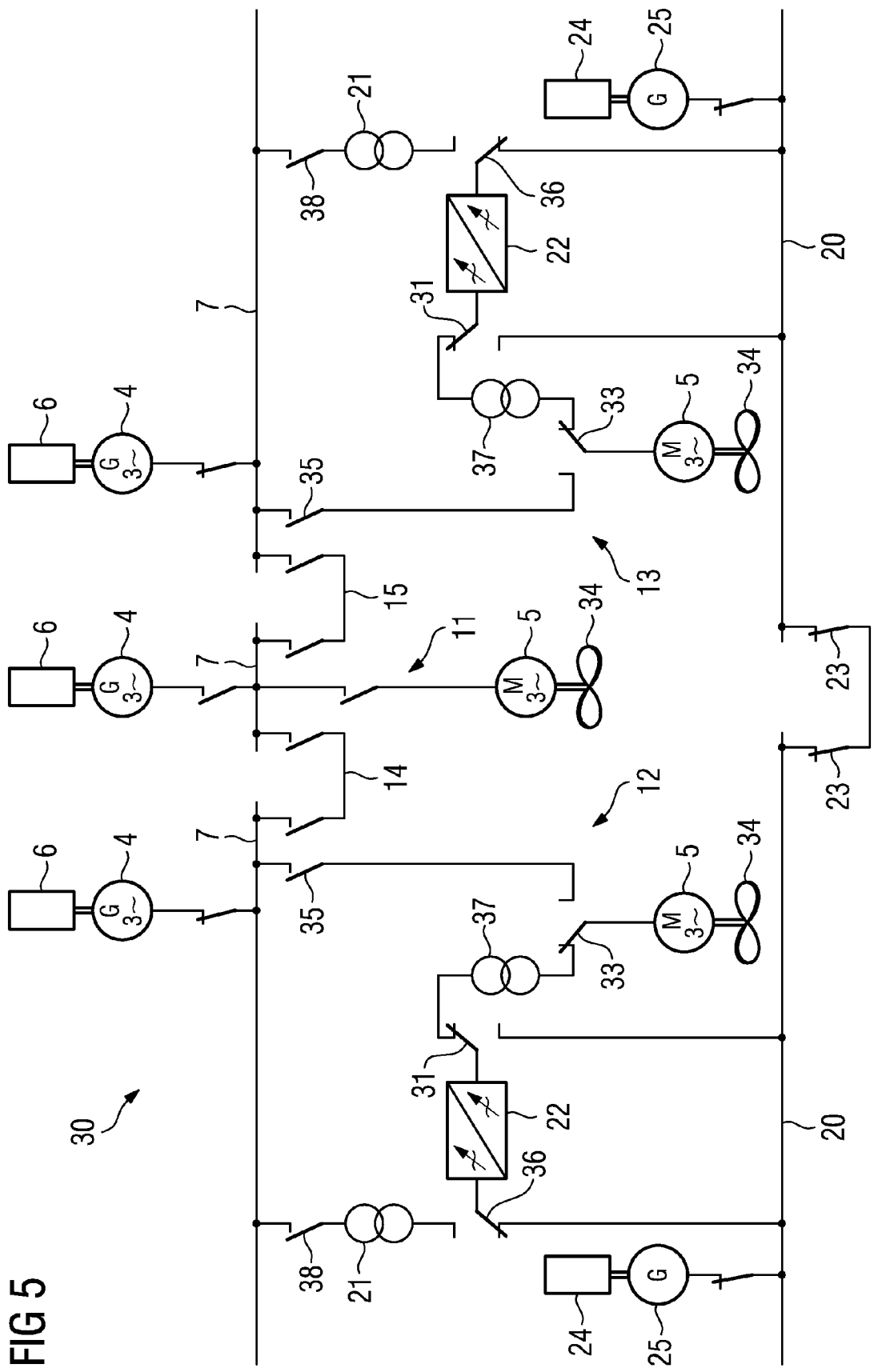
FIG. 5 shows the example embodiment from FIG. 3 in a second special operating state.

In a second special operating state shown in FIG. 5, the drive motors 5 are fed from an electrical onboard power subnetwork 20 by way of a respective electrical onboard power network converter 22. In order to stabilize the electrical onboard power subnetworks 20 it is advantageous for these to be coupled to each other by way of the switches 23.

For that purpose the electrical onboard power network converters 22 can be connected on the input side either to the respective busbar 7 or to the respective electrical onboard power subnetwork 20 by way of the switch 36. On the output side the electrical onboard power network converter 22 is connectable either to the electrical onboard power subnetwork 20 by way of the switch 31 or to the drive motor 5 by way of the transformer 37 and the switch 33.

The electrical onboard power network converter 22 receives a voltage of constant amplitude and frequency on the input side and converts it into a voltage of variable amplitude and frequency for supplying the respective drive motor 5.

The second special operating state can be used on the one hand to supply the drive motors 5 with current by way of the port generators 25 in the event of a failure of the generators 4.

Alternatively to the first special operating state, however, the second special operating state can also be used to supply the drive motors with current at low speeds which lead to speed requirements imposed on the diesel engines 6 that lie below their minimum speed requirements.

If in this case the electrical onboard power network converter 22 is fed on the input side, not from the electrical onboard power (sub)network 20, but by the generator 4 by way of the busbar 7, the generator 4 will generate a voltage of constant amplitude and frequency. For example, the diesel engine 6 driving the generator 4 will then be operated at its minimum speed. The electrical onboard power network converter 22 then converts the voltage of constant amplitude and frequency present at its input into a voltage of variable amplitude and frequency for supplying the respective drive motor 5, the frequency of the converted voltage being less than the frequency of the voltage generated by the generator 4.

In the second special operating state the electrical onboard power subnetworks 20 can be supplied with current either by the port generators 25 or by way of an additional electrical onboard power network converter (not shown in further detail) which is connected to the busbar 7 for example by way of the transformer 21 and the switch 38.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A ship drive system comprising:
   at least a first and a second electric drive shaft, each of the first and second drive shafts being provided for driving a propulsion unit;
   an electrical onboard power network converter connectable to the first and second drive shafts, the electrical onboard power network converter being supplied with motor voltage having variable amplitude and variable frequency of one of the drive shafts, to convert said motor voltage into a voltage having constant amplitude and constant frequency for an electrical onboard power network, wherein each of the first and second electric drive shafts comprise:

at least one speed-variable generator, driven by an internal combustion engine, to generate a motor voltage having variable amplitude and variable frequency; and at least one speed-variable drive motor downstream of the at least one speed-variable generator and directly supplied with said motor voltage without an intervening converter and coupled to a propulsion unit, the first and the second drive shaft being switchable from a first operating state in which they are electrically decoupled from each other, to a second operating state in which they are electrically coupled to each other in such a way that a transfer of energy takes place from the at least one generator of one of the first and second electric drive shafts to the at least one drive motor of the other of the first and second electric drive shafts thereby simultaneously operating respective propulsion units and wherein at least one of the drive shafts is switchable from an operating state in which the at least one generator of the at least one drive shaft is electrically coupled to the at least one drive motor of the at least one drive shaft without the electrical onboard power network converter being interposed therebetween and generates a voltage of variable amplitude and frequency, to an operating state in which the at least one generator of the at least one drive shaft is electrically coupled to the at least one drive motor of the at least one drive shaft by way of the electrical onboard power network converter, the electrical onboard power network converter generating a voltage of variable amplitude and frequency.

2. The ship drive system of claim 1, further comprising a third electric drive shaft for driving a further propulsion unit, wherein the third drive shaft comprises at least one speed-variable generator, driven by an internal combustion engine, to generate a motor voltage having variable amplitude and variable frequency; and at least one speed-variable drive motor supplied with said motor voltage and coupled to the further propulsion unit, and wherein the first and the third drive shaft are switchable from a first operating state in which they are electrically decoupled from each other, to a second operating state in which they are electrically coupled to each other in such a way that a transfer of energy takes place from the at least one generator of one of the first and second electric drive shafts to the at least one drive motor of the other one of the first and second electric drive shafts.

3. The ship drive system of claim 1, wherein the at least one generator includes a superconductor winding.

4. The ship drive system of claim 1, wherein the at least one drive motor includes a superconductor winding.

5. The ship drive system of claim 4, wherein the superconductor winding is a rotating rotor winding.

6. The ship drive system of claim 1, wherein the drive shafts are coupled by way of an electric line connection which includes a superconductor.

7. The ship drive system of claim 2, wherein the second and the third drive shaft serve as the main drive for a lower speed range of the vessel and the first drive shaft on its own or in combination with the second and the third drive shaft serves as the main drive for a higher speed range up to the maximum speed of the vessel.

8. The ship drive system of claim 7, wherein the internal combustion engine of the first drive shaft is embodied as a gas turbine and the internal combustion engines of the second and the third drive shaft are embodied as diesel engines.

9. The ship drive system of claim 1, wherein the electrical onboard power network converter includes a first electrical onboard power network converter, supplied with the motor voltage having variable amplitude and variable frequency of the second drive shaft, to convert said voltage into a voltage having constant amplitude and constant frequency for a first electrical onboard power subnetwork, and a second electrical onboard power network converter, supplied with the motor voltage having variable amplitude and variable frequency of the third drive shaft, to convert said voltage into a voltage having constant amplitude and constant frequency for a second electrical onboard power subnetwork.

10. The ship drive system of claim 9, wherein the two electrical onboard power subnetworks are coupleable to each other.

11. The ship drive system of claim 1, further comprising:

at least one additional electrical onboard power network generator for supplying the electrical onboard power network with a voltage having constant amplitude and constant frequency.

12. The ship drive system of claim 1, wherein the at least one generator of the drive shaft is drivable by the internal combustion engine driving it optionally at a fixed or at a variable frequency.

13. The ship drive system of claim 1, wherein the at least one drive shaft is switchable from an operating state in which the at least one generator of the at least one drive shaft is electrically coupled to the at least one drive motor of the drive shaft without the electrical onboard power network converter being interposed therebetween and generates a voltage of variable amplitude and frequency, to an operating state in which the electrical onboard power network or electrical onboard power subnetwork is electrically coupled to the at least one drive motor of the at least one drive shaft by way of the electrical onboard power network converter, the electrical onboard power network converter generating a voltage of variable amplitude and frequency.

14. A multihulled vessel, comprising:
the ship drive system of claim 1.

15. The ship drive system of claim 1, wherein the propulsion unit is a waterjet.

16. The ship drive system of claim 3, wherein the superconductor winding is a high-temperature superconductor winding.

17. The ship drive system of claim 4, wherein the superconductor winding is a high-temperature superconductor winding.

18. The ship drive system of claim 6, wherein the superconductor is a high-temperature superconductor.

19. The multihulled vessel of claim 14, wherein the multihulled vessel is a trimaran.

20. The ship drive system of claim 1, wherein the electrical onboard power network converter generating a voltage of variable amplitude and frequency when connected to the at least one drive shaft.

* * * * *